(12) United States Patent
Deleeuw

(10) Patent No.: US 10,127,224 B2
(45) Date of Patent: Nov. 13, 2018

(54) EXTENSIBLE CONTEXT-AWARE NATURAL LANGUAGE INTERACTIONS FOR VIRTUAL PERSONAL ASSISTANTS

(71) Applicant: Intel Corporation, Santa Clara, CA (US)

(72) Inventor: William C. Deleeuw, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/129,645

(22) PCT Filed: Aug. 30, 2013

(86) PCT No.: PCT/US2013/057559
§ 371 (c)(1),
(2) Date: Dec. 27, 2013

(87) PCT Pub. No.: WO2015/030796
PCT Pub. Date: Mar. 5, 2015

(65) Prior Publication Data
US 2016/0179787 A1      Jun. 23, 2016

(51) Int. Cl.
*G06F 17/27*  (2006.01)
*G06F 17/30*  (2006.01)
*G10L 15/22*  (2006.01)

(52) U.S. Cl.
CPC ...... *G06F 17/2785* (2013.01); *G06F 17/2775* (2013.01); *G06F 17/30769* (2013.01);
(Continued)

(58) Field of Classification Search
CPC ............. G06F 17/2785; G06F 17/2775; G06F 17/30914; G06F 17/30769; G10L 15/22
(Continued)

(56) References Cited

U.S. PATENT DOCUMENTS 8,370,143 B1 *  2/2013  Coker ................... G06F 17/276
                                            704/240
8,977,965 B1 *  3/2015  Ehlen .................... G06F 3/0482
                                            715/719
(Continued)

FOREIGN PATENT DOCUMENTS

| CN | 102792320 A | 11/2012 |
|----|-------------|---------|
| EP | 2575128 A2  | 4/2013  |
| WO | 2011093691 A2 | 8/2011 |

OTHER PUBLICATIONS

International Search Report and Written Opinion received for International Application No. PCT/US2013/057559, dated May 26, 2014, 15 pages.

(Continued)

*Primary Examiner* — Edwin S Leland, III
(74) *Attorney, Agent, or Firm* — Barnes & Thornburg LLP

(57) ABSTRACT

Technologies for extensible, context-aware natural language interactions include a computing device having a number of context source modules. Context source modules may be developed or installed after deployment of the computing device to a user. Each context source module includes a context capture module, a language model, one or more database query mappings, and may include one or more user interface element mappings. The context capture module interprets, generates, and stores context data. A virtual personal assistant (VPA) of the computing device indexes the language models and generates a semantic representation of a user request that associates each word of the request to a language model. The VPA translates the user request into a database query, and may generate a user interface element for the request. The VPA may execute locally on the computing device or remotely on a cloud server. Other embodiments are described and claimed.

20 Claims, 8 Drawing Sheets

(52) U.S. Cl.
CPC .. *G06F 17/30914* (2013.01); *G06F 17/30976* (2013.01); *G10L 15/22* (2013.01)

(58) Field of Classification Search
USPC .......................................................... 704/9
See application file for complete search history.

(56) References Cited

U.S. PATENT DOCUMENTS

| | | | | |
|---|---|---|---|---|
| 9,116,989 | B1* | 8/2015 | Ehlen | G06F 17/30554 |
| 2002/0087315 | A1* | 7/2002 | Lee | G06Q 30/06 |
| | | | | 704/9 |
| 2009/0144143 | A1 | 6/2009 | Iyer | |
| 2009/0271195 | A1* | 10/2009 | Kitade | G10L 15/065 |
| | | | | 704/239 |
| 2010/0153318 | A1* | 6/2010 | Branavan | G06F 17/241 |
| | | | | 706/12 |
| 2010/0195806 | A1* | 8/2010 | Zhang | H04M 3/42153 |
| | | | | 379/88.01 |
| 2010/0333037 | A1* | 12/2010 | Pavlovski | G06F 3/0481 |
| | | | | 715/848 |
| 2011/0153324 | A1* | 6/2011 | Ballinger | G10L 15/30 |
| | | | | 704/235 |
| 2012/0016678 | A1 | 1/2012 | Gruber et al. | |
| 2012/0059653 | A1* | 3/2012 | Adams | G10L 15/19 |
| | | | | 704/243 |
| 2012/0109624 | A1* | 5/2012 | Yang | G06F 17/277 |
| | | | | 704/2 |
| 2012/0191449 | A1* | 7/2012 | Lloyd | H04M 1/04 |
| | | | | 704/231 |
| 2012/0265528 | A1* | 10/2012 | Gruber | G10L 15/18 |
| | | | | 704/235 |
| 2013/0174034 | A1* | 7/2013 | Brown | G06F 3/048 |
| | | | | 715/708 |
| 2013/0204813 | A1 | 8/2013 | Master et al. | |
| 2013/0262442 | A1* | 10/2013 | Dennis | G06F 17/30011 |
| | | | | 707/722 |
| 2015/0032443 | A1* | 1/2015 | Karov | G06F 17/2785 |
| | | | | 704/9 |
| 2015/0234800 | A1* | 8/2015 | Ehlen | G06F 17/24 |
| | | | | 715/202 |
| 2015/0370784 | A1* | 12/2015 | Nissan | G06F 17/2809 |
| | | | | 704/2 |
| 2016/0179787 | A1* | 6/2016 | Deleeuw | G06F 17/2785 |
| | | | | 704/9 |
| 2016/0224622 | A1* | 8/2016 | Wang | G06F 17/30722 |
| 2016/0365093 | A1* | 12/2016 | Nissan | G10L 15/187 |

OTHER PUBLICATIONS

"Natural language processing," Wikipedia, The Free Encyclopedia, retrieved from: <http://en.wikipedia.org/w/index.php?title=Natural_language_processing&oldid=524544195>, edited Nov. 23, 2012, 8 pages.

"Automated online assistant," Wikipedia, The Free Encyclopedia, retrieved from: <http://en.wikipedia.org/w/index.php?title=Automated_online_assistant&oldid=521739395>, edited Nov. 6, 2012, 3 pages.

"Intelligent personal assistant," Wikipedia, The Free Encyclopedia, retrieved from: <http://en.wikipedia.org/w/index.php?title=Intelligent_personal_assistant&oldid=520490140>, edited Oct. 29, 2012, 2 pages.

Chinese Office Action in Chinese Patent Application No. 20130078627.2, dated Apr. 2, 2018 (15 pages).

* cited by examiner

EXTENSIBLE CONTEXT-AWARE NATURAL LANGUAGE INTERACTIONS FOR VIRTUAL PERSONAL ASSISTANTS

CROSS REFERENCE TO RELATED APPLICATIONS

This application is a national stage entry under 35 USC § 371(b) of International Application No.PCT/US2013/057559, which was filed Aug. 30, 2013.

BACKGROUND

Virtual personal assistants are artificial intelligence systems that perform tasks on a computing device in response to natural-language requests from a user. Typical virtual personal assistants are monolithic applications that handle a finite set of tasks for the user, such as calendaring, reminders, and messaging. Those virtual personal assistants understand how to respond to a number of natural language phrases associated with those tasks. Extending the capabilities of virtual personal assistants generally requires extensive modifications to analyze and respond to natural language relating to the new capabilities. For example, systems based on a grammar model must be substantially changed for any new vocabulary or phrasing behavior. Similarly, systems based on a dictation model may require extensive effort to integrate required training sets of spoken data. The effort and/or amount of data required to integrate new capabilities may increase exponentially as additional capabilities are added.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
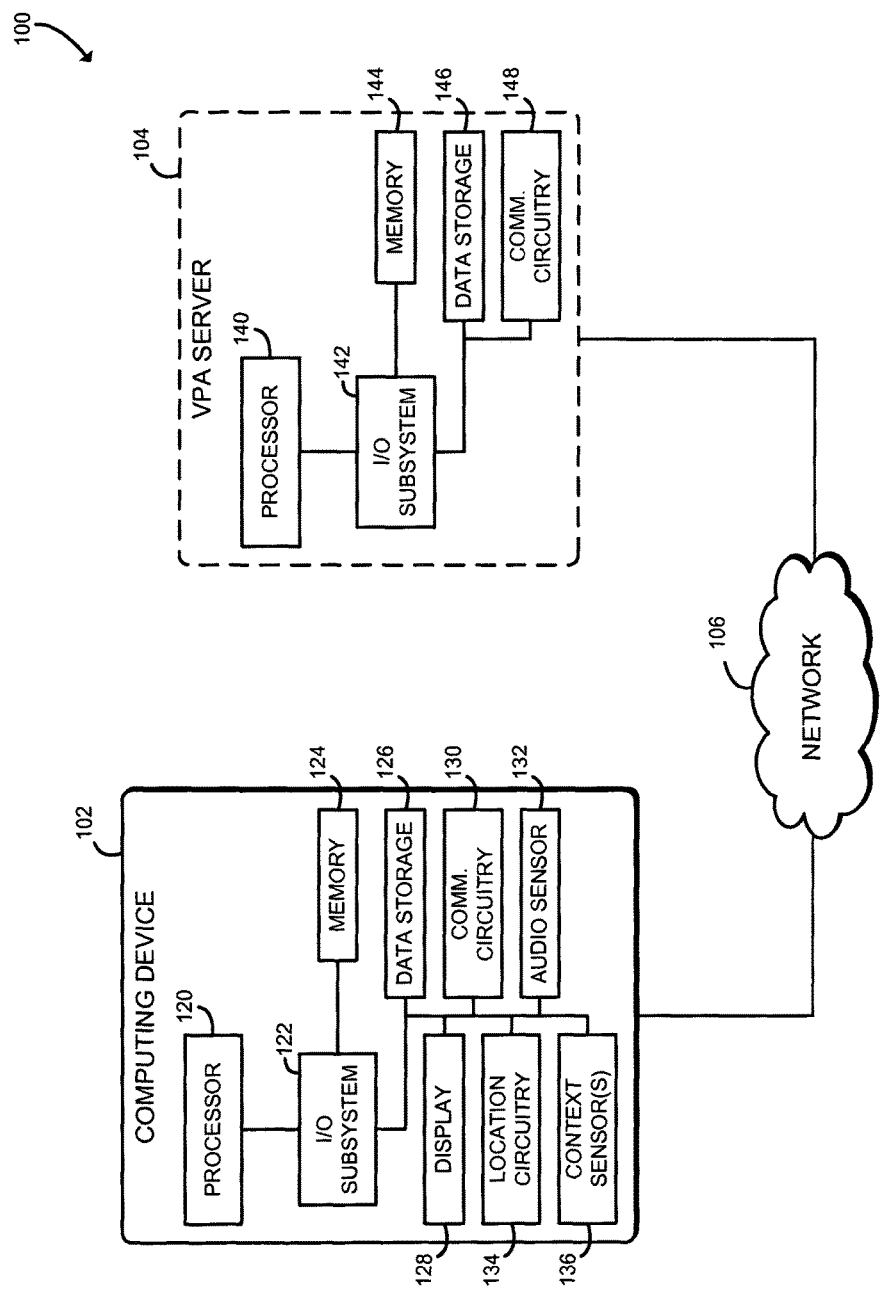
FIG. 1 is a simplified block diagram of at least one embodiment of an extensible system for context-aware natural language interaction with a virtual personal assistant.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); or (A, B, and C). Similarly, items listed in the form of "at least one of A, B, or C" can mean (A); (B); (C): (A and B); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative system 100 for extensible, context-aware natural language interaction with a virtual personal assistant (VPA) includes a computing device 102 and, in some embodiments, a VPA server 104, which may be in communication with each other over a network 106. In use, the user of the computing device 102 initiates a VPA command and speaks a natural language request to the computing device 102. The virtual personal assistant, which may execute natively on the computing device 102 or on the remote VPA server 104, interprets the request and performs the requested data operation. The virtual personal assistant may index and search many language models that are each associated with a particular situational context (e.g., the current location of the user) in order to find the best interpretation of the user request. Applying language specific to particular contexts when attempting to understand a natural language request mimics human behavior and thus may improve the quality of interaction with the virtual personal assistant.

The computing device 102 presents the results of the user query, which may be received from the VPA server 104, using user interface elements that are also generated based on the particular context of the request. The language models, data operation mappings, and user interface element mappings are all associated with particular context sources (e.g., a location or particular activity context source) installed on the computing device 102. Those same context sources also capture and interpret data generated by context sensors of the computing device 102. Thus, the capabilities and available contexts of the virtual personal assistant may be extended by installing additional context sources, each of which includes all metadata necessary to interpret natural language, handle user requests, and display results. Accordingly, details of data capture, language, and data interactions may all be encapsulated in the context source, which may improve the extensibility and reduce the development complexity of the virtual personal assistant.

The computing device 102 may be embodied as any type of device capable of performing the functions described herein. For example, the computing device 102 may be embodied as, without limitation, a smartphone, a cellular phone, a tablet computer, a notebook computer, a laptop computer, a desktop computer, a distributed computing system, a multiprocessor system, a consumer electronic device, a smart appliance, and/or any other computing device capable of recognizing spoken user commands. As shown in FIG. 1, the illustrative computing device 102 includes a processor 120, an I/O subsystem 122, memory 124, and a data storage device 126. Of course, the computing device 102 may include other or additional components, such as those commonly found in a portable computer (e.g., various input/output devices), in other embodiments. Additionally, in some embodiments, one or more of the illustrative components may be incorporated in, or otherwise from a portion of, another component. For example, the memory 124, or portions thereof, may be incorporated in the processor 120 in some embodiments.

The processor 120 may be embodied as any type of processor capable of performing the functions described herein. For example, the processor may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The data storage device 126 may store program files, plugins, or add-on modules for context sources available to the computing device 102, and may serve as temporary or permanent storage for audio data captured by the computing device 102.

The computing device 102 further includes a display 128, communication circuitry 130, and an audio sensor 132. The display 128 of the computing device 102 may be embodied as any type of display capable of displaying digital information such as a liquid crystal display (LCD), a light emitting diode (LED), a plasma display, a cathode ray tube (CRT), or other type of display device. In some embodiments, the display 128 may be coupled to a touch screen to receive user input.

The communication circuitry 130 of the computing device 102 may be embodied as any communication circuit, device, or collection thereof, capable of enabling communications between the computing device 102, the VPA server 104, and/or other remote devices. The communication circuitry 130 may be configured to use any one or more communication technology (e.g., wireless or wired communications) and associated protocols (e.g., Ethernet, Bluetooth®, Wi-Fi®, WiMAX, etc.) to effect such communication.

The audio sensor 132 may be embodied as any sensor capable of capturing audio signals such as a microphone, a line input jack and associated circuitry, an analog-to-digital converter (ADC), or other type of audio sensor. The audio sensor 132 may be used by the computing device 102 to detect speech commands uttered by the user, as described below.

The computing device 102 further includes location circuitry 134 and may include one or more other context sensor(s) 136. The location circuitry 134 may be embodied as any type of sensor or circuitry capable of determining the precise or approximate position of the computing device 102. For example, the location circuitry 134 may be embodied as a global positioning system ("GPS") receiver, capable of determining the precise coordinates of the computing device 102. In other embodiments, the location circuitry 134 may use trilateration and/or triangulation to determine the position of the computing device 102 using distances and/or angles to cellular network towers with known positions, provided by the communication circuitry 130. In other embodiments, the location circuitry 134 may determine the approximate position of the computing device 102 based on association to wireless networks with known positions, using the communication circuitry 130.

The context sensor(s) 136 may be embodied as any other sensor or sensors capable of detecting the context of the computing device 102 or its user. The context of the computing device 102 may include the location, environmental conditions, time of day, identity of the user, current activity of the user, or other conditions of the computing device 102. In some embodiments, the context sensor(s) 136 may be embodied as or incorporated in other sensors of the computing device 102. For example, the context sensor(s) may sense particular wireless networks using the communication circuitry 130, ambient noise levels using the audio sensor 132, or other context-related data.

In those embodiments in which the system 100 includes the VPA server 104, the VPA server 104 is configured to perform context-aware natural language interpretation as well as performing virtual personal assistant services. The VPA server 104 may be embodied as any type of server computing device, or collection of devices, capable of performing the functions described herein. Illustratively, the VPA server 104 includes a processor 140, an I/O subsystem 142, memory 144, a data storage 146, communication circuitry 148, and/or other components and devices commonly found in a server or similar computing device. The individual components of the VPA server 104 may be similar to the corresponding components of the computing device 102, the description of which is applicable to the corresponding components of the VPA server 104 and is not repeated herein so as not to obscure the present disclosure. Further, the VPA server 104 may be embodied as a single server computing device or a collection of servers and associated devices. For example, in some embodiments, the VPA server 104 may be embodied as a "virtual server" formed from multiple computing devices distributed across a network and operating in a public or private cloud. Accordingly, although the VPA server 104 is illustrated in FIG. 1 and described below as embodied as a single server computing device, it should be appreciated that the VPA server 104 may be embodied as multiple devices cooperating together to facilitate the functionality described below.

As discussed in more detail below, the computing device 102 and the VPA server 104 may be configured to transmit and receive data with each other and/or other devices of the system 100 over the network 106. The network 106 may be embodied as any number of various wired and/or wireless networks. For example, the network 106 may be embodied as, or otherwise include, a wired or wireless local area network (LAN), a wired or wireless wide area network (WAN), and/or a publicly-accessible, global network such as the Internet. As such, the network 106 may include any number of additional devices, such as additional computers, routers, and switches, to facilitate communications among the devices of the system 100.

Figure 2:
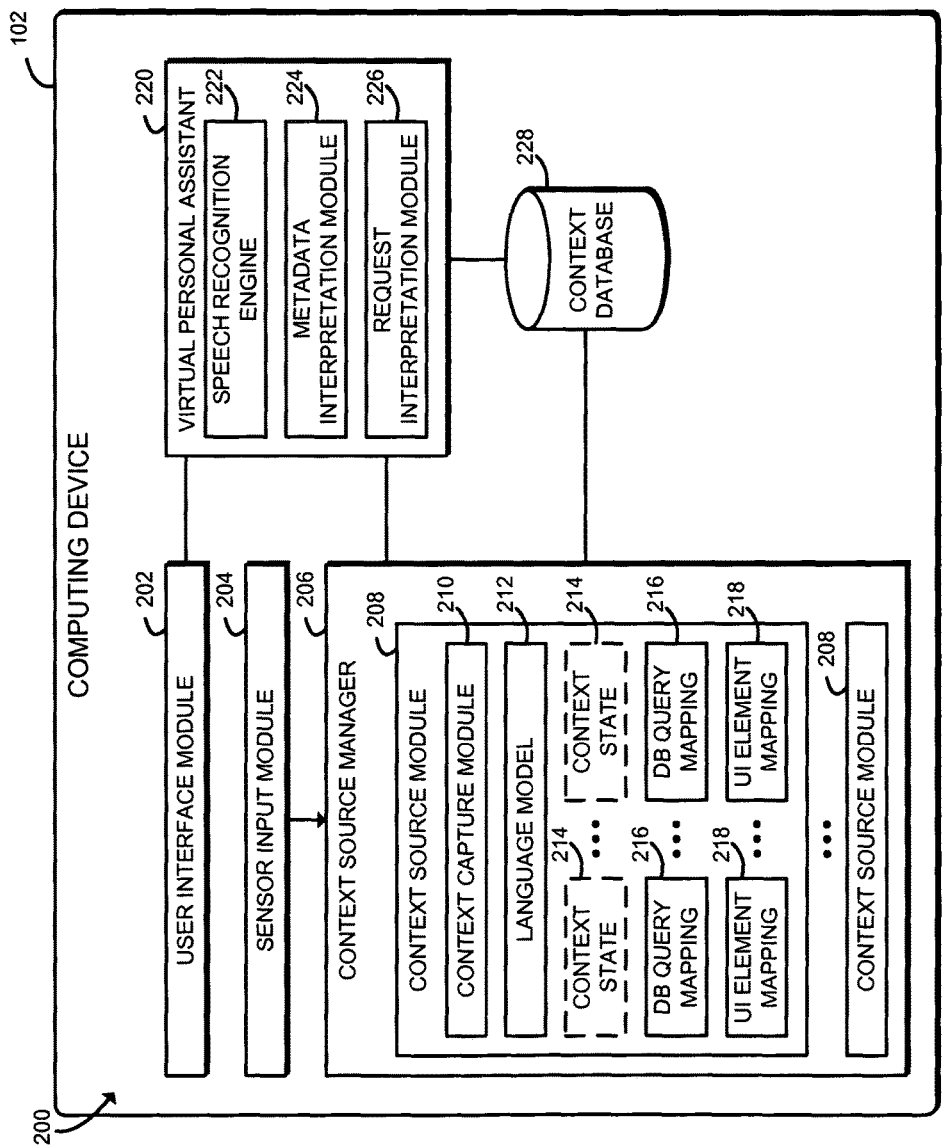
FIG. 2 is a simplified block diagram of at least one embodiment of an environment of a computing device of FIG. 1.

Referring now to FIG. 2, in the illustrative embodiment, the computing device 102 establishes an environment 200 during operation. The illustrative environment 200 includes a user interface module 202, a sensor input module 204, a context source manager 206, a virtual personal assistant 220, and a context database 228. The various modules of the environment 200 may be embodied as hardware, firmware, software, or a combination thereof.

The user interface module 202 is configured to allow the user of the computing device 102 to invoke virtual personal assistant commands and render user interface elements to allow the user to consume or otherwise interact with results of those virtual personal assistant commands. The user interface module 202 may allow for one or more modes of human-computer interaction. For example, the user interface module 202 may provide one or more hardware buttons, a traditional graphical user interface using the display 128, and/or voice command and control. The user interface module 202 may capture audio input data representing the natural language requests of the user, for example using the audio sensor 132.

The sensor input module 204 is configured to receive sensor input from various contextual sensors of the computing device 102 and provide the sensor input to the context source manager 206 as potential context source data. For example, the sensor input module 204 may provide location information sensed by the location circuitry 134, and/or any other contextual data sensed by the context sensors(s) 136.

The context source manager 206 is configured to manage installation and enumeration of one or more context source modules 208. Each context source module 208 is a self-contained module configured both to capture and store contextual source data received by the computing device 102 and to support natural language requests relating to the captured context data. The contextual source data may be embodied as any data relevant to a particular situational context of the computing device 102. As described above, the situational context of the computing device 102 may include, for example, the location, environmental conditions, time of day, identity of the user, current activity of the user, or any other condition of use of the computing device 102. For example, context source modules 208 may exist for particular geographic locations, including specialized locations such as work or home, or for particular user activities such working, commuting, or consuming media. Each context source module 208 may be embodied as a separate memory device, data file, or collection of files, and may be installed or loaded by the context source manager 206 after the computing device 102 has been deployed to an end user. For example, each context source module 208 may be implemented as a plug-in, an add-on, a package, an archive, a disk image, a jar file, or any other component used to extend the capabilities of the computing device 102. As described below, each context source module 208 may store captured context data in the context database 228 or provide a storage service to allow context data to be stored in the context database 228. Each context source module 208 may be developed by different entities, such as the device manufacturer, third-party developer, or end user. It should be appreciated that the parties developing the context capture capabilities of a context source module 208 are well-positioned to provide the metadata required for natural language interactions in that context.

As described earlier, each context source module 208 also includes metadata necessary to interpret natural language requests relating to captured context data. The metadata includes a model of the natural language vocabulary and/or grammar applicable to the context source, including a list of common words and phrases associated with that context. Additionally or alternatively, in some embodiments the metadata may include language models for several natural languages (e.g., English, French, Spanish, etc.), and the context source module 208 may select the most appropriate language model based on the natural language primarily used on the computing device 102. The metadata may also include mappings between natural language elements and particular database queries for the context database 228, as well as mappings between natural language elements and user interface elements usable by the user interface module 202. In some embodiments, each context source module 208 may include one or more context states, which each may be associated with different natural language elements, database query mappings, and/or user interface element mappings. In some embodiments, those functions may be performed by sub-modules, for example by a context capture module 210, a language model 212, one or more database query mappings 216, one or more user interface element mappings 218, and in some embodiments one or more context states 214.

The virtual personal assistant 220 is configured to interpret and respond to natural language user requests received from the user interface module 202. The virtual personal assistant 220 performs speech recognition on audio input data representing the user request. The virtual personal assistant 220 also interprets the metadata associated with one or more of the context source modules 208 in order to perform contextual interpretation of the user request. For example, the virtual personal assistant 220 may index and search language models 212 from each of several context source modules 208 to interpret the user request in its proper context. In some embodiments, the metadata may be stored in the context database 228, which may allow multiple computing devices to perform contextual interpretation of user requests. After interpreting the language of the user request, the virtual personal assistant 220 performs the requested action and may provide results to the user interface module 202. In some embodiments those functions may be performed by sub-modules, for example by a speech recognition engine 222, a metadata interpretation module 224, or a request interpretation module 226.

The context database 228 is configured to store context data that has been captured by the computing device 102. When responding to user requests, the virtual personal assistant 220 may access and manipulate context data stored in the context database 228. As described above, contextual data may include location, environmental conditions, time of day, identity of the user, current activity of the user, or any other data that may be captured and formatted for storage by the context source modules 208. Although illustrated as resident in the computing device 102, in some embodiments part or all of the context database 228 may be stored in an external database server or cloud service. In such embodiments, the context database 228 may be shared among several computing devices.

Figure 3:
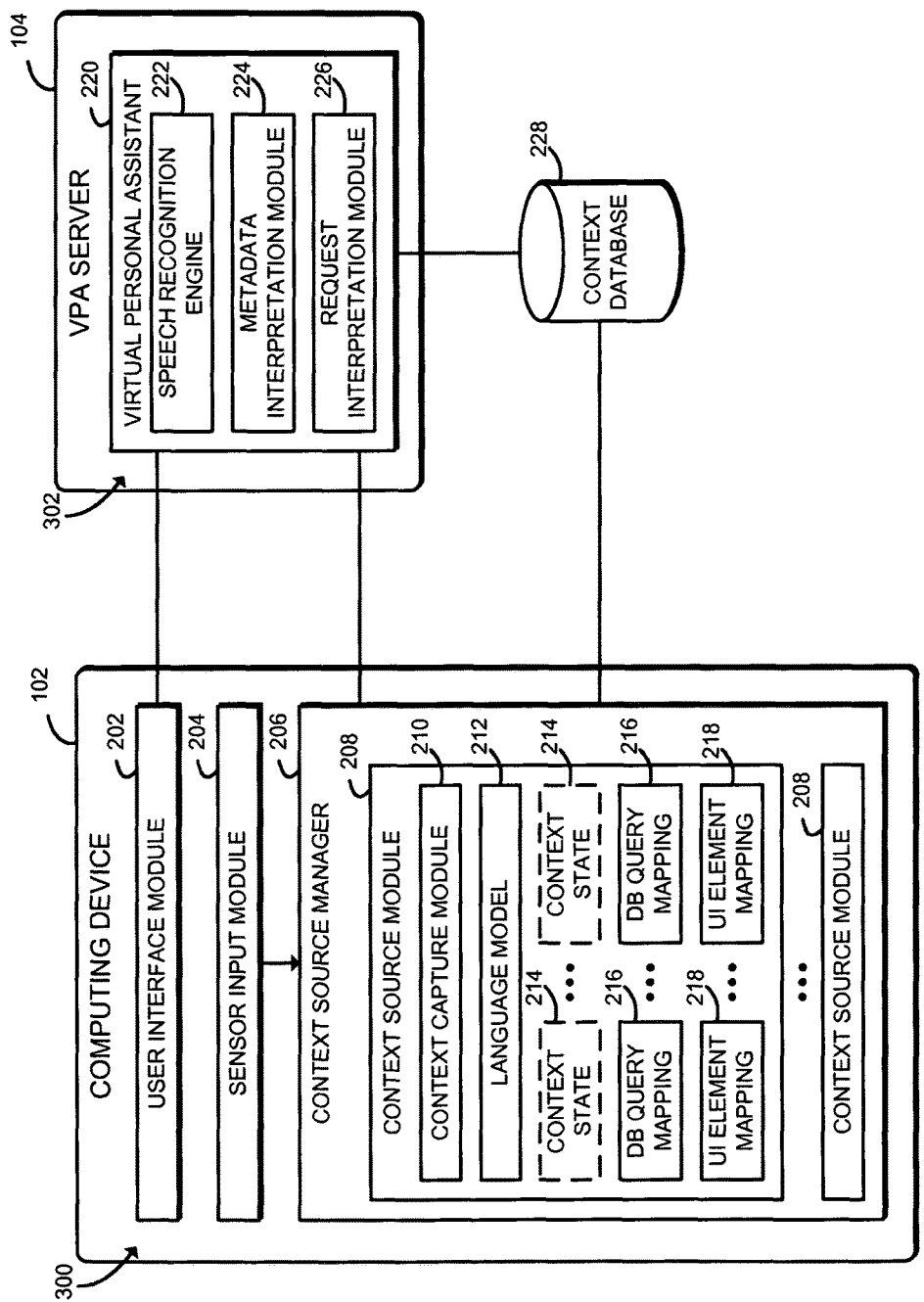
FIG. 3 is a simplified block diagram of at least one embodiment of a pair of environments of a computing device and VPA server of FIG. 1.

Referring now to FIG. 3, in embodiments in which the system 100 includes the VPA server 104, the computing device 102 establishes an environment 300 and the VPA server 104 establishes an environment 302 during operation. In that embodiment, the environment 300, on the computing device 102, includes the user interface module 202, the sensor input module 204, and the context source module 208. The environment 302, on the VPA server 104, includes the virtual personal assistant 220. As described above, the context database 228 may be embodied on one or more external database servers or cloud services. The various modules of the computing device 102 and the VPA server 104 perform the same functions as the modules described above in connection with FIG. 2, and may be embodied as hardware, firmware, software, or a combination thereof. Further, data may be communicated between the various modules of the computing device 102 and the VPA server 104 using the network 106. For example, the user interface module 202 may transmit audio input data over the network 106 to the virtual personal assistant 220, the context source manager 206 may transmit captured context data over the network 106 to the context database 228, and the context source manager 206 may transmit one or more context source modules 208 and/or sub-modules of the context source modules 208 over the network 106 to the virtual personal assistant 220.

Figure 4:
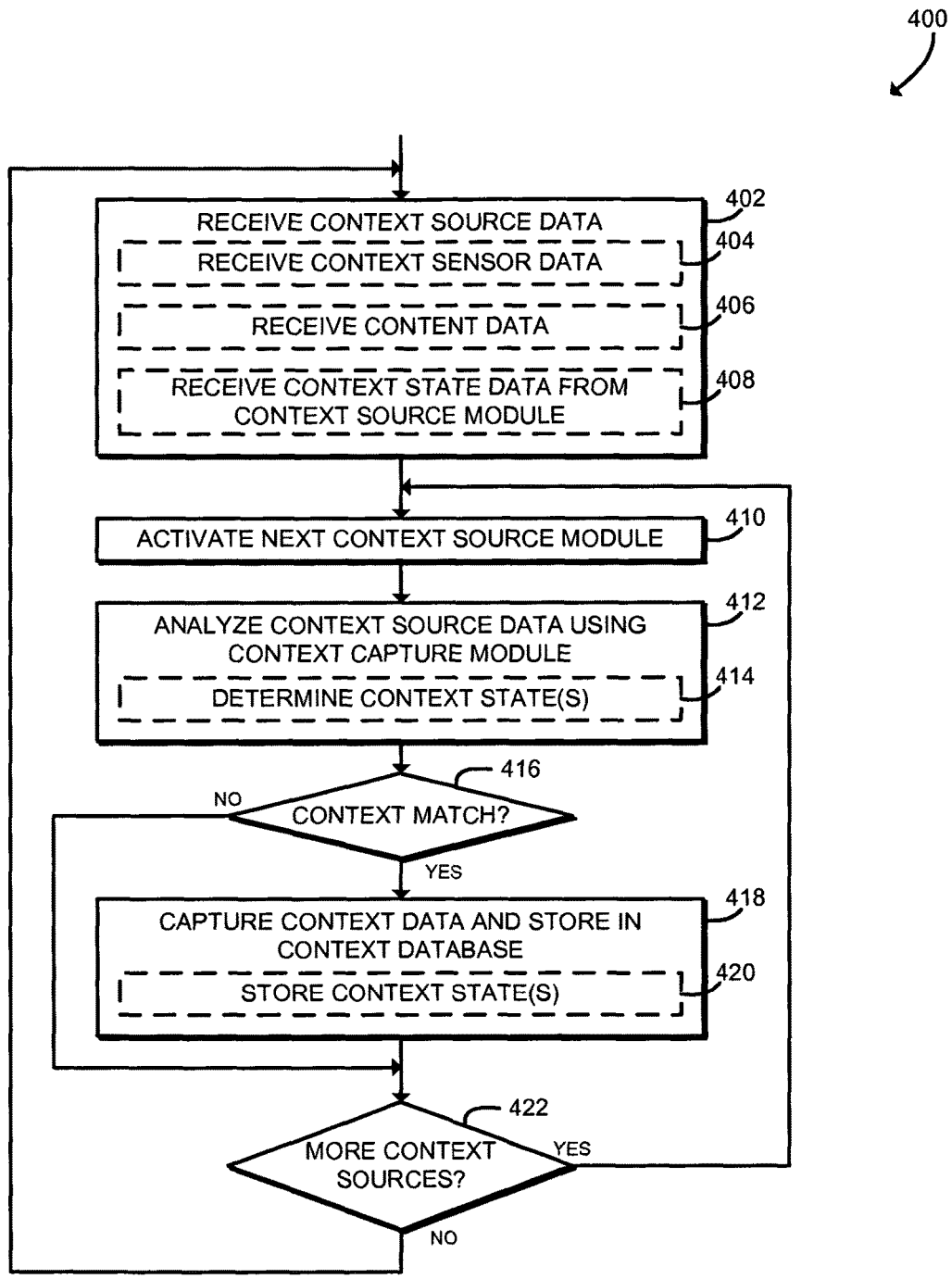
FIG. 4 is a simplified flow diagram of at least one embodiment of a method for context-aware data capture that may be executed by the computing device of FIGS. 1-3.

Referring now to FIG. 4, in use, the computing device 102 may execute a method 400 for context-aware data capture. The method 400 begins with block 402, in which the computing device 102 receives context source data. The context source data may include any data that indicate the context of the computing device 102 or the user or from which such context can be determined. In some embodiments, in block 404 the computing device 102 may receive context sensor data from various sensors of the computing device 102. For example, the computing device 102 may receive location data from the location circuitry 134, ambient noise data from the audio sensor 132, or other context sensor data from one or more of the context sensor(s) 136. Additionally, in some embodiments, the computing device 102 may receive content data in block 406. The content data, such as documents, web pages, media files, or other digital content, may be generated by one or more applications of the computing device 102 or may be received from one or more remote devices. The content data may reveal the context of the computing device 102 or the user. For example, the content may indicate that the user is currently viewing web pages, or working on documents. Further, in some embodiments, in block 408, the computing device 102 may receive context state data from a context source module 208. In other words, the current context of the computing device 102 may be determined by combining or cascading context source modules 208. For example, one context source module 208 may determine the geographic location of the computing device 102, and another context source module 208 may determine that the computing device 102 is located at logical locations such as "home" or "work."

In block 410, the computing device 102 activates the next context source module 208, which may be embodied as any one of the context source modules 208 during the first iteration of the method 400. The activated context source module 208 will be used to capture and interpret context data based on the received context source data. The computing device 102 may use the context source manager 206 to load the context source module 208. The context source module 208 may be loaded from the data storage device 126, received from a remote computing device, or otherwise provisioned to the computing device 102 after the computing device 102 has been received by an end user. In some embodiments, the context source module 208 may be loaded and/or configured ahead of time, and in block 410 the computing device 102 may select the context source module 208 for analysis.

In block 412, the computing device 102 analyzes the context source data using the context capture module 210 of the context source module 208. As part of that analysis, the computing device 102 determines whether the context capture module 210 is capable of interpreting the context source data. For example, a calendaring context may interpret context source data relating to the user's activities, and a location context may interpret context source data relating to the user's position. In some embodiments, in block 414 the computing device 102 may determine one or more context states 214 that are applicable to the context source data. In block 416, the computing device 102 determines whether the context source module 208 is capable of interpreting the context source data. If not, the method 400 branches ahead to block 422, discussed below. If the context matches, the method 400 advances to block 418.

In block 418, the computing device 102 captures context data and stores the context data in the context database 228. The computing device 102 uses the context capture module 210 of the current context source module 208 to interpret, analyze, format, or otherwise capture the context data. In some embodiments, the computing device 102 may directly execute functionality provided by the context capture module 210, for example by invoking externally available functions or public interface methods. In some embodiments, the computing device 102 may interpret metadata associated with the context capture module 210 to control context capture processes of the computing device 102. Further, in some embodiments, in block 420 the computing device 102 may also store the context states 214 associated with the context data in the context database 228.

In block 422, the computing device 102 determines whether additional context source modules 208 are available. The computing device 102 may query the context source manager 206 to make that determination. If additional context sources are available, the method 400 loops back to block 410 to activate the next context source module 208 and attempt to interpret the context source data. If no additional context sources are available, the method 400 loops back to block 402 to monitor additional context source data. Although the illustrative method 400 iterates through the context source modules 208 sequentially, in other embodiments the context source modules 208 may interpret context source data in parallel or in any other ordering.

Figure 5:
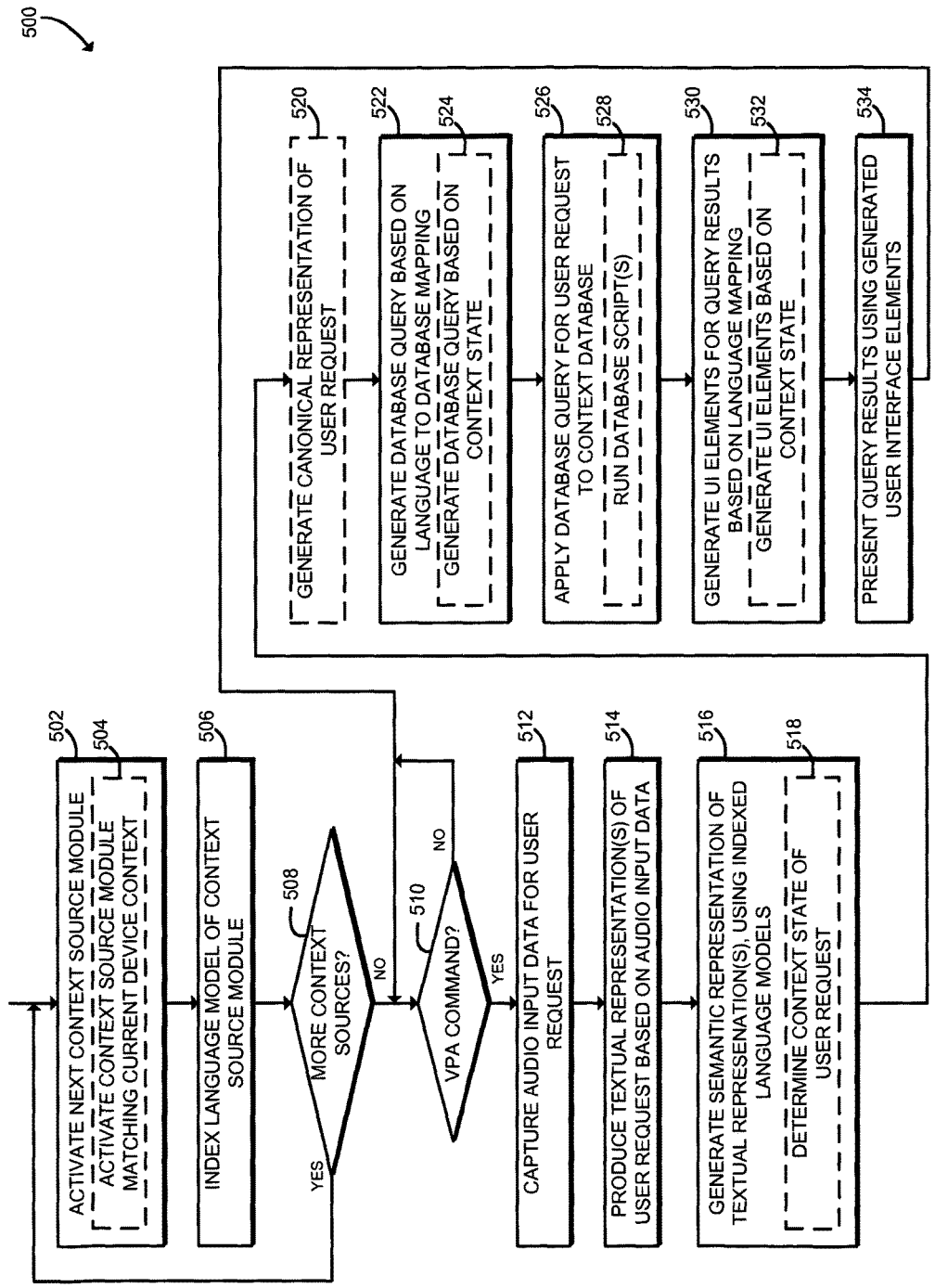
FIG. 5 is a simplified flow diagram of at least one embodiment of a method for context-aware natural language interaction that may be executed by the computing device of FIGS. 1 and 2.

Referring now to FIG. 5, in use, the computing device 102 may execute a method 500 for context-aware natural language interaction. The method 500 begins in block 502, in which the computing device 102 activates the next context source module 208, which again may be embodied as any one of the context source modules 208 during the first iteration of the method 500. As described above, the activated context source module 208 contains metadata that may be used to perform context-aware interpretation of the user request, including a language model 212, and one or more database query mappings 216. Additionally, in some embodiments, the metadata may, or may not, include one or more user interface element mappings 218. The computing device 102 may use the context source manager 206 to load the context source module 208. The context source module 208 may be loaded from the data storage device 126, received from a remote computing device, or otherwise provisioned to the computing device 102 after the computing device 102 has been deployed to an end user. In some embodiments, the context source module 208 may be loaded and/or configured ahead of time, and in block 508 the computing device 102 may select the context source module 208 for analysis. In some embodiments, in block 504, the computing device 102 may activate a context source module 208 matching the current device context as the next context source module 208. That is, the computing device 102 may determine whether the context capture module 210 of the context source module 208 is capable of capturing or interpreting context data for the current device context. In such embodiments, processing will thus be limited to contexts relevant to the current device context.

In block 506, the computing device 102 indexes the language model 212 of the context source module 208. Indexing the language model 212 allows the computing device 102 to later compare the language model 212 to language of a user request. In some embodiments, the computing device 102 may calculate the term frequency-inverse document frequency ("TF-IDF") statistic for every word or phrase appearing in the language model 212. The TF-IDF is a measurement of the frequency at which a particular term is included in a document as compared to its frequency across all documents, and is thus a numerical measure of the importance of a particular term to a document. User requests that include language important to a language model 212 are thus likely to involve the context of that language model 212. Other measures useful for searching or indexing terms in documents may be used additionally or alternatively in other embodiments.

In block 508, the computing device 102 determines whether additional context source modules 208 are available. The computing device 102 may query the context source manager 206 to make that determination. If additional context sources are available, the method 500 loops back to block 502 to activate the next context source module 208 and index the next language model 212. If no additional context source modules 208 are available, the method 500 advances to block 510. Although illustrated as iterating through the context source modules 208 sequentially, in some embodiments the computing device 102 may index the language models 212 in parallel or as a single aggregate task.

In block 510, the computing device 102 determines whether the user has invoked a virtual personal assistant (VPA) command. The user may invoke the command by pressing a button, selecting an option in a user interface, speaking a command word, or any other method of human-computer interaction. If no VPA command has been invoked, the method 500 loops back to block 510 to continue monitoring for VPA commands. If a VPA command has been invoked, the method 500 advances to block 512.

In block 512, the computing device 102 captures audio input data using the audio sensor 132. The audio input data represents a natural-language request spoken by the user of the computing device 102. The audio input data may be stored in any format useable for further analysis and manipulation, including compressed or uncompressed formats. In block 514, the computing device 102 produces one or more textual representations of the user request, based on the audio input data. Each textual representation includes a string of words representing the user request. To produce the textual representations, the computing device 102 may process the audio input data using any appropriate speech recognition technique or algorithm. The speech recognition algorithm may generate one or more potential textual representations of the user request, and may rank the requests according to their likelihood of being correct. In other embodiments (not illustrated), the computing device 102 may receive a textual representation of the user request directly from the user, for example through a standard text input user interface element.

In block 516, the computing device 102 generates a semantic representation of the textual representation using the indexed language models 212. Where multiple textual representations have been generated, the semantic representation represents one of the textual representations selected as a best fit. The semantic representation associates each word or contextually consistent group of consecutive words ("n-gram") of the textual representation to a particular language model 212, thus placing each word or group of words in context. The semantic representation is generated by searching through the indexed language models 212 using many potential word groupings within the textual representation and finding word groupings and associated language models 212 that are statistically most likely. In some embodiments, each word of the textual representation may be "stemmed" to derive a root word, which may reduce the size of the language models 212 and/or improve matching of user queries. One embodiment of an algorithm for generating the semantic representation is described further below in connection with FIG. 6.

In some embodiments, in block 518 the computing device 102 may determine a context state 214 applicable to the user request. As described above, some contexts have multiple context states 214, which each may use different descriptive language or a different subset of the language. The computing device 102 may determine the context state 214 by applying various subsets of the language model 212 to the user request as described above, and determining the context state 214 associated with the best-matching subset of the language model 212.

In some embodiments, in block 520 the computing device 102 may generate a canonical representation of the semantic representation using the indexed language models 212. The computing device 102 may use the language models 212 to select standardized vocabulary and/or grammar used in a particular context to describe the user request. The canonical representation may be used by the computing device 102 for further processing of the user request. Additionally, the canonical representation may be repeated to the user, allowing the user to confirm that the computing device 102 has accurately interpreted the user request. Thus, generating the canonical representation may allow the computing device 102 to simulate active listening, which may be a desirable natural language feature.

In block 522, the computing device 102 generates a database query based on the semantic representation and one or more of the database query mappings 216 of the context source modules 208. As described above, the semantic representation associates each word or contextually consistent word grouping of the user request with a language model 212. As further described above, that language model 212 is associated with a context source module 208, and the context source module 208 is, in turn, associated with one or more database query mappings 216. Each of the database query mappings 216 is capable of translating language used in a particular context into appropriate database commands. In some embodiments, in block 524 the computing device 102 may select a database query mapping 216 based on the context state 214 of the user request determined in block 518. The database query mapping 216 translates the words of a user's request into particular actions to be taken against the context data. The database query mapping 216 may generate data selection queries, data creation queries, data update queries, data removal queries, database scripts, or any other action on the context data.

In block 526, the computing device 102 applies the database query to the context database 228. As described above, applying the database query may create, update, or delete context data in the context database 228, and may also return query results. Query results may include context data returned from the context database 228 as well as status information returned by the database query. In some embodiments, in block 528 the computing device 102 may run any database scripts associated with the query. In some embodiments, the query results may be retained, and the query process may be repeated to further refine the query results. In such embodiments, the computing device 102 may loop back to block 510 to receive a new or refined user request, as described above. For example, the computing device 102 may refine the query results in response to selection of a user interface element or receipt of a spoken command. Additionally or alternatively, the computing device 102 may automatically refine the query results in response to an unsuccessful database query (e.g., no results returned or too many results returned).

In block 530, the computing device 102 generates user interface elements for the query results based on a user interface element mapping 218. As described above, the semantic representation associates each word or contextually consistent word grouping of the user request with a language model 212. As further described above, that language model 212 is associated with a context source module 208, and the context source module 208 is, in turn, associated with zero or more user interface element mappings 218.

If no user interface element mapping 218 is associated with the context source module 208, then the computing device 102 may use or generate a default user interface element mapping 218. Each of the user interface element mappings 218 is capable of presenting query results in a particular context to the user. In some embodiments, in block 532 the computing device 102 may select a user interface element mapping 218 based on the context state 214 of the user request determined in block 518. The user interface element mapping 218 translates the words of a user's request into particular user interface elements appropriate for the query. In some embodiments, the user interface elements may be embodied as badges, labels, or other indicators that signify to the user the appropriate context of particular query results. Additionally or alternatively, in some embodiments, the user interface elements may be embodied as text, graphics, tables, or other user interface widgets used to display the query results in an appropriate format for the user. The user interface elements may include native user interface windows or views, textual markup language elements, text-to-speech scripts, images, or any other user interface element compatible with the computing device 102.

In block 534, the computing device 102 presents the query results using the generated user interface elements. For example, in some embodiments, the computing device 102 may display the user interface elements on the display 128, allowing the user to view and manipulate the results of the user request. Additionally or alternatively, the computing device 102 may read the results aloud, for example using a text-to-speech generator. In such example, the computing device 102 may provide a spoken response to the user's spoken request, allowing natural language interaction. It should be understood that a single user request may involve multiple contexts that each contribute to the generated database query and user interface elements. For example, the user may ask, "What was that that page I saw on the bus about the meteor shower?" That example request may involve three context source modules 208: browsing history (the "page I saw"), location ("on the bus"), and content ("about the meteor shower"). Each context source module 208 may contribute to the database query, for example retrieving the set of all webpages viewed, restricting to those viewed while on the bus, and further restricting to those referencing "meteor shower." Similarly, each context source module 208 may contribute a user interface element, for example icons of a web page and a bus. After presenting the query results, the method 500 loops back to block 510 to monitor for further VPA commands. In some embodiments (not shown), the method 500 may loop back to block 502 to re-index the language models 212.

Figure 6:
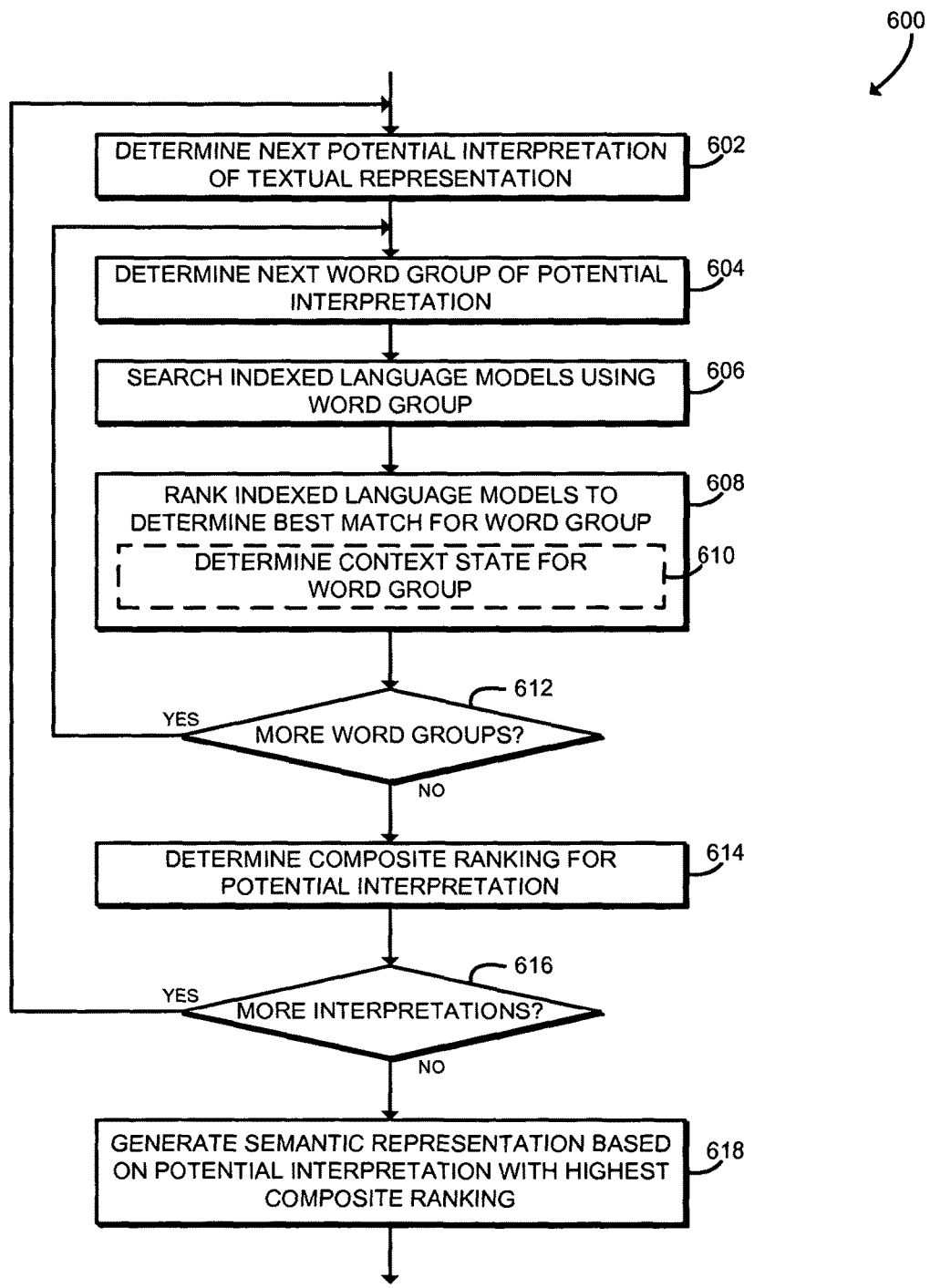
FIG. 6 is a simplified flow diagram of at least one embodiment of a method for contextual request interpretation that may be executed by the systems of FIGS. 1-3.

Referring now to FIG. 6, in use, the computing device 102 may execute a method 600 for generating the semantic representation using the indexed language models 212. The method 600 begins in block 602, in which the computing device 102 determines the next potential interpretation of the textual representation of the user request. As described above, the textual representation includes a string of words in the user request that may be generated through speech recognition or directly from text entry. An interpretation of the textual representation includes one or more word groups selected from the textual representation. For example, one potential interpretation may split the textual representation into word groups including three words each. Other potential interpretations may include word groups of different sizes, from the length of the user request down to a single word per word group. In other embodiments, the word groups may be chosen based on grammatical structure of the textual representation, or using any other selection criteria. The potential interpretations may include all or a substantial part of all possible word groupings within the textual representation.

In block 604, the computing device 102 determines the next word group of the current potential interpretation. As described above, the word group includes one or more words selected from the textual representation. In block 606, the computing device 102 searches the indexed language models 212 for the current word group. Searching the indexed language models 212 may return a statistical measure of the relevance of the current word group to each particular language model 212. For example, as described above, the computing device 102 may calculate the term frequency-inverse document frequency ("TF-IDF") for each term appearing in the language model 212. The search process would return the TF-IDF value for the particular word group, if found in that language model 212.

In block 606, the computing device 102 ranks the language models 212 in order of relevance to the word group. The highest-ranking language model 212 is thus associated with a context that is most likely to be applicable to the current word group. Ranking the language models 212 may include sorting the language models 212 based on the TF-IDF value returned for the current word group. In block 608, in some embodiments the computing device 102 may determine a context state 214 for the word group. Each context state 214 may be associated with a subset of a language model 212, and the context states 214 may be ranked similarly.

In block 610, the computing device 102 determines whether the potential interpretation includes additional word groups. If additional word groups remain, the method 600 loops back to block 604 to process the next word group. If no additional word groups remain, the method 600 advances to block 612. Although the method 600 illustrates processing the word groups sequentially, in some embodiments they may be processed in parallel or in any other ordering.

In block 612, the computing device 102 generates a composite ranking for the current potential interpretation. The composite ranking is a statistical measurement of how well the potential interpretation fits the indexed language models 212. The composite ranking may be generated by summing all of the TF-IDF values determined for the word groups of the potential interpretation.

In block 614, the computing device 102 determines whether additional potential interpretations remain for the textual representation. Additionally, if several textual representations have been generated during speech recognition, the computing device 102 may determine whether potential interpretations remain for those textual representations. If additional potential interpretations remain, the method 600 loops back to block 602 to process the next potential interpretation. If no potential interpretations remain, the method 600 advances to block 616. Although the method 600 illustrates processing the potential interpretations sequentially, in some embodiments they may be processed in parallel or in any other ordering.

In block 616, the computing device 102 generates the semantic representation based on the potential interpretation with the highest composite ranking. In other words, the computing device 102 generates the semantic representation based on the potential interpretation that best matches the language models 212. The computing device 102 may determine the best-matching interpretation by sorting the potential interpretations according to composite TF-IDF values. After generating the semantic representation, the method 600 is complete, and the computing device 102 may use the semantic representation for further processing.

Figure 7:
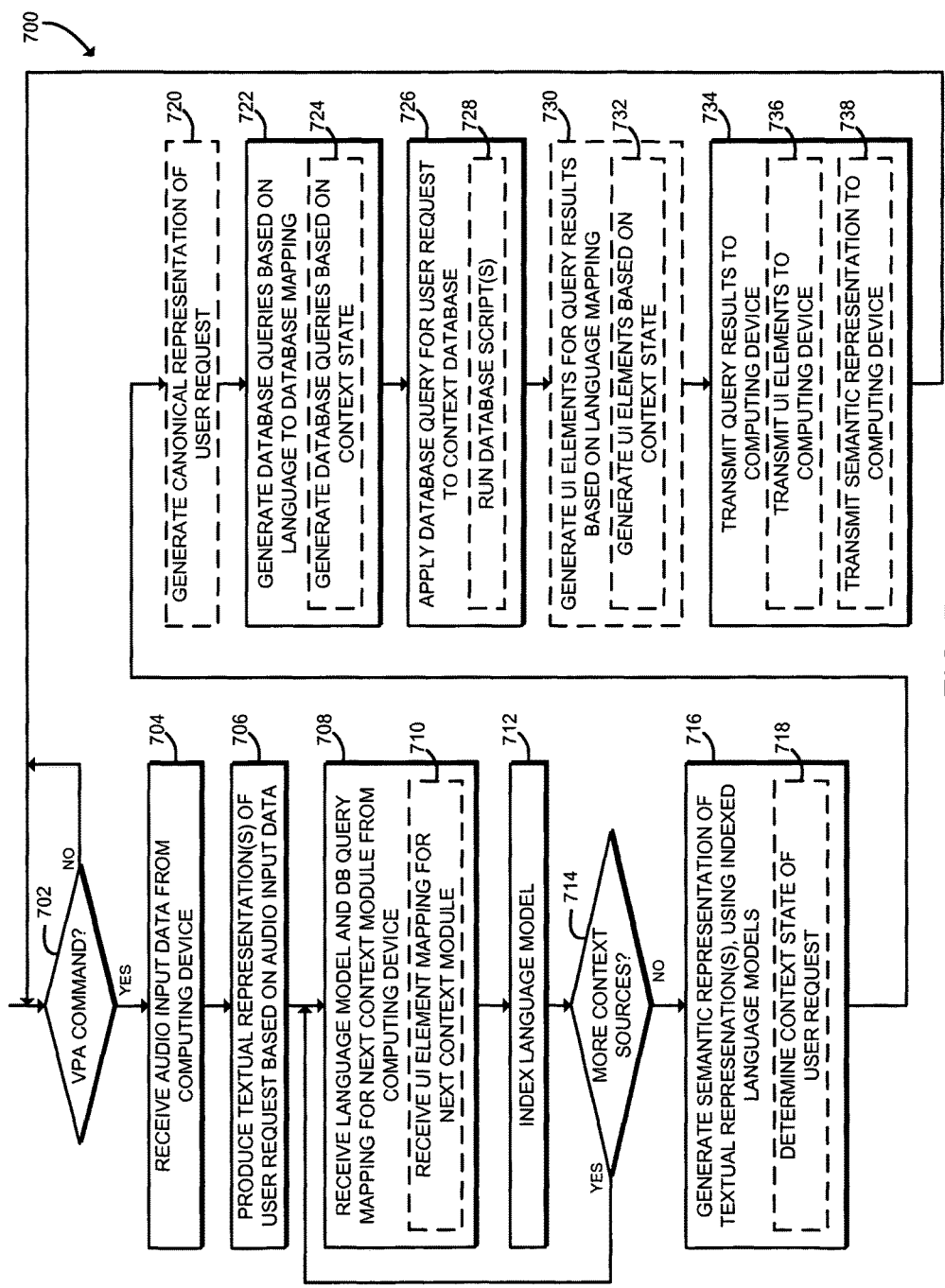
FIG. 7 is a simplified flow diagram of at least one embodiment of a method for context-aware natural language interaction that may be executed by the VPA server of FIGS. 1 and 3.

Referring now to FIG. 7, in embodiments in which the system 100 includes the VPA server 104, the VPA server 104 may execute a method 700 for context-aware natural language interaction. The method 700 begins in block 702, in which the VPA server 104 determines whether a VPA command has been received from a computing device 102. The computing device 102 may transmit a VPA command in response to a user invocation, for example by pressing a button, selecting an option in a user interface, speaking a command word, or any other method of human-computer interaction. If no VPA command has been invoked, the method 700 loops back to block 702 to continue monitoring for VPA commands. If a VPA command has been invoked, the method 700 advances to block 704.

In block 704, the VPA server 104 receives audio input data from the computing device 102. The audio input data was captured by the computing device 102 using the audio sensor 132 and represents a natural-language request spoken by the user. As described above, the audio input data may be stored in any format useable for further analysis and manipulation, including compressed or uncompressed formats. In block 706, the VPA server 104 produces one or more textual representations of the user request, based on the audio input data. Each textual representation includes a string of words representing the user request. To produce the textual representations, the VPA server 104 may process the audio input data using any appropriate speech recognition technique or algorithm. The speech recognition algorithm may generate one or more potential textual representations of the user request, and may rank the requests according to their likelihood of being correct. In other embodiments (not illustrated), the VPA server 104 may receive a textual representation of the user request directly from the computing device 102.

In block 708, the VPA server 104 receives a language model 212 and a database query mapping 216 from the computing device 102. In block 710, in some embodiments the VPA server 104 may receive a user interface element mapping 218 from the computing device 102. The language model 212, the database query mapping 216, and, if applicable, the user interface element mapping 218 all originate from the same context source module 208 on the computing device 102. Thus, those components may be added, substituted, modified, or upgraded after the computing device 102 is possessed by an end user. Additionally, those components—and therefore the supported contexts—may be customized for each computing device 102. Further, although illustrated as receiving those components during processing of a VPA command, in some embodiments the VPA server 104 may receive those components ahead of time, for example when registering the computing device 102, or when a context source module 208 is installed on the computing device 102.

In block 712, the VPA server 104 indexes the language model 212 received from the computing device 102. Indexing the language model 212 allows the VPA server 104 to later compare the language model 212 to language of a user request. In some embodiments, the VPA server 104 may calculate the term frequency-inverse document frequency ("TF-IDF") statistic for every word or phrase appearing in the language model 212. As described above, TF-IDF measures the frequency that a particular term is included in a document as compared to its frequency across all documents, and is thus a numerical measure of the importance of a particular term to a document. User requests that include language important to a language model 212 are thus likely to involve the context of that language model 212. Other measures useful for searching or indexing terms in documents may be used additionally or alternatively in other embodiments.

In block 714, the VPA server 104 determines whether additional context source modules 208 are available on the computing device 102. The VPA server 104 may transmit a query to the computing device 102 to make that determination. If additional context sources are available, the method 700 loops back to block 708 to receive a language model 212 and language mappings for the next context source. If no additional context sources are available, the method 700 advances to block 716. Although illustrated as iterating through the language models 212 sequentially, in some embodiments the VPA server 104 may index the language models 212 in parallel or as a single aggregate task.

In block 716, the VPA server 104 generates a semantic representation of the textual representation using the indexed language models 212. Where multiple textual representations have been generated, the semantic representation represents one of the textual representations selected as a best fit. The semantic representation associates each word or word grouping of the textual representation to a particular language model 212, thus placing each word or word grouping in context. The semantic representation is generated by searching through the indexed language models 212 using many potential word groupings within the textual representation and finding word groupings and associated language models 212 that are statistically most likely. The algorithm for generating the semantic representation described above in connection with FIG. 6 may also be executed by the VPA server 104.

In some embodiments, in block 718 the VPA server 104 may determine a context state 214 applicable to the user request. As described above, some contexts have multiple context states 214, which each may use different descriptive language or a different subset of the language. The computing device 102 may determine the context state 214 by applying various subsets of the language model 212 to the user request as described above, and determining the context state 214 associated with the best-matching subset of the language model 212.

In some embodiments, in block 720 the VPA server 104 may generate a canonical representation of the semantic representation using the language models 212. The VPA server 104 may use the language models 212 to select standardized vocabulary and grammar used in a particular context to describe the user request. The canonical representation may be used by VPA server 104 for further processing of the user request. Additionally, the canonical representation may be transmitted to the computing device 102, allowing the user to confirm that the VPA server 104 has accurately interpreted the user request. Thus, generating the canonical representation may allow the VPA server 104 to simulate active listening, which may be a desirable natural language feature.

In block 722, the VPA server 104 generates a database query based on the semantic representation and one or more database query mappings 216 received from the computing device 102. As described above, the semantic representation associates each word or word grouping of the user request with a language model 212. As further described above, that language model 212 is associated with one or more database query mappings 216, and both the language model 212 and the database query mappings 216 originate from the same context source module 208 on the computing device 102. Each of the database query mappings 216 is capable of translating language used in a particular context into appropriate database commands. In some embodiments, in block 724 the VPA server 104 may select a database query mapping 216 based on the context state 214 of the user request determined in block 718. The database query mapping 216 translates the words of a user's request into particular actions to be taken against the context data. The database query mapping 216 may generate data selection queries, data creation queries, data update queries, data removal queries, database scripts, or any other action on the context data.

In block 726, the VPA server 104 applies the database query to the context database 228. As described above, applying the database query may create, update, or delete context data in the context database 228, and may also return query results. Query results may include context data returned from the context database 228 as well as status information returned by the database query. In some embodiments, in block 728 the VPA server 104 may run any database scripts associated with the query. In some embodiments, the query results may be retained, and the query process may be repeated to further refine the query results. In such embodiments, the VPA server 104 may loop back to block 702 to receive a new or refined user request, as described above. For example, the VPA server 104 may refine the query results in response to a command received from the computing device 102. Additionally or alternatively, the VPA server 104 may automatically refine the query results in response to an unsuccessful database query (e.g., no results returned or too many results returned).

In some embodiments, in block 730 the VPA server 104 may generate user interface elements for the query results based on a user interface element mapping 218. As described above, the semantic representation associates each word or word grouping of the user request with a language model 212. As further described above, that language model 212 may be associated with one or more user interface element mappings 218 received from the computing device 102. The language model 212 and the associated user interface element mappings 218 each originate from the same context source module 208 on the computing device 102. Each of the user interface element mappings 218 is capable of presenting query results in a particular context to the user. In some embodiments, in block 732 the VPA server 104 may select a user interface element mapping 218 based on the context state 214 of the user request determined in block 718. The user interface element mapping 218 translates the words of a user's request into particular user interface elements appropriate for the query. In some embodiments, the user interface elements may be embodied as badges, labels, or other indicators that signify to the user the appropriate context of particular query results. Additionally or alternatively, in some embodiments, the user interface elements may be embodied as text, graphics, tables, or other user interface widgets used to display the query results in an appropriate format for the user. The user interface elements may include native user interface windows or views, textual markup language elements, text-to-speech scripts, images, or any other user interface element. The VPA server 104 may generate several versions of the user interface elements, and the computing device 102 may select and present compatible user interface elements from the generated user interface elements.

In block 734, the VPA server 104 transmits the query results to the computing device 102, thus satisfying the user request. In some embodiments, in block 736 the VPA server 104 may transmit the generated user interface elements associated with the query results to the computing device 102. For example, the VPA server 104 may transmit the query results formatted in a textual markup language. Additionally or alternatively, in block 738, in some embodiments the VPA server 104 may transmit the semantic representation of the user request generated in block 716 to the computing device 102. Upon receipt of the semantic representation the computing device 102 may perform further processing, for example generating user interface elements locally on the computing device 102. After transmitting the query results, the method 700 loops back to block 702 to monitor for additional VPA commands.

Figure 8:
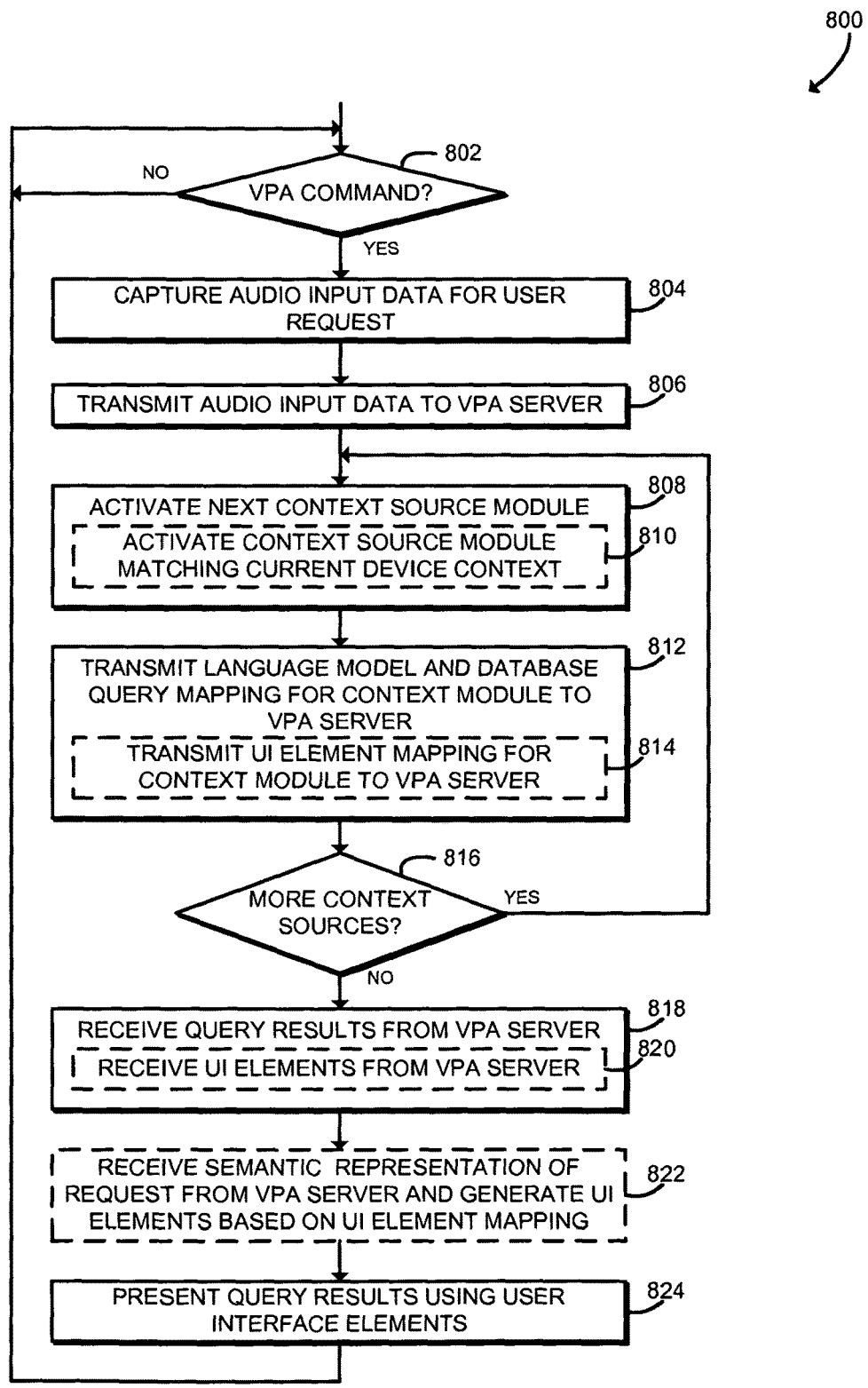
FIG. 8 is a simplified flow diagram of at least one embodiment of a method for context-aware natural language interaction that may be executed by the computing device of FIGS. 1 and 3.

Referring now to FIG. 8, in embodiments in which the system 100 includes the VPA server 104, the computing device 102 may execute a method 800 for context-aware natural language interaction. The method 800 begins in block 802, in which in which the computing device 102 determines whether the user has invoked a virtual personal assistant (VPA) command. The user may invoke the command by pressing a button, selecting an option in a user interface, speaking a command word, or any other method of human-computer interaction. If no VPA command has been invoked, the method 800 loops back to block 802 to continue monitoring for VPA commands. If a VPA command has been invoked, the method 800 advances to block 804.

In block 804, the computing device 102 captures audio input data using the audio sensor 132. The audio input data represents a natural-language request spoken by the user of the computing device 102. The audio input data may be stored in any format useable for further analysis and manipulation, including compressed or uncompressed formats.

In block 806, the computing device 102 transmits the captured audio input data to the VPA server 104. As described above, the VPA server 104 will perform speech recognition on the audio input data to produce a textual representation of the user request. In some embodiments (not illustrated) the computing device 102 may transmit the textual representation directly to the VPA server 104, which may be determined through local speech recognition or through direct text input from the user of the computing device 102.

In block 808, the computing device 102 activates the next context source module 208. As described above, the activated context source module 208 contains metadata that may be used to perform context-aware interpretation of the user request, including a language model 212 and one or more database query mappings 216. Additionally, in some embodiments, the metadata may, or may not, include one or more user interface element mappings 218. The computing device 102 may use the context source manager 206 to load the context source module 208. The context source module 208 may be loaded from the data storage device 126, received from a remote computing device, or otherwise provisioned to the computing device 102 after the computing device 102 has been deployed to an end user. In some embodiments, the context source module 208 may be loaded and/or configured ahead of time, and in block 808 the computing device 102 may select the context source module 208 for analysis. In some embodiments, in block 810, the computing device 102 may activate a context source module 208 matching the current device context as the next context source module 208. That is, the computing device 102 may determine whether the context capture module 210 of the context source module 208 is capable of capturing or interpreting context data for the current device context. In such embodiments, processing will thus be limited to contexts relevant to the current device context.

In block 812, the computing device 102 transmits the language model 212 and any database query mappings 216 associated with the current context source module 208 to the VPA server 104. In some embodiments, in block 814, the computing device 102 also transmits any user interface element mappings 218 associated with the current context source module 208 to the VPA server 104. After receipt, the VPA server 104 will use the language model 212 and the language mappings to analyze and interpret the user request. Although illustrated as occurring after receiving a VPA command, in some embodiments the computing device 102 may transmit the language models 212 and any associated language mappings to the VPA server 104 ahead of time, for example upon registration with the VPA server 104 or upon installation of the context source module 208.

In block 816, the computing device 102 determines whether additional context source modules 208 are available. The computing device 102 may query the context source manager 206 to make that determination. If additional context sources are available, the method 800 loops back to block 808 to activate the next context source module 208 and transmit the next language model 212 and related language mappings. If no additional context sources are available, the method 800 advances to block 816.

In block 818, the computing device 102 receives query results from the VPA server 104 corresponding to the user request. As described above, the query results may be the result of a database operation applied to the context database 228. In some embodiments, in block 820 the computing device 102 may receive one or more user interface elements corresponding to the query results from the VPA server 104. As described above, the user interface elements allow presentation of the query results and may indicate to the user the particular context in which the user request was interpreted. For example, the computing device 102 may receive the query results and user interface elements as a formatted a textual markup language document.

In block 822, in some embodiments, the computing device 102 may receive a semantic representation of the user request from the VPA server 104. The received semantic representation results from the contextual analysis performed by the VPA server 104, using the context source metadata supplied by the computing device 102. The semantic representation associates each word or contextually consistent word grouping of the user request with a language model 212, putting the language of the request in context. The computing device 102 generates user interface elements for the query results based on a user interface element mapping 218 associated with the appropriate language model 212, or an appropriate default user interface element mapping 218. As described above, each of the user interface element mappings 218 is capable of presenting query results in a particular context to the user. In some embodiments, the user interface elements may be embodied as badges, labels, or other indicators that signify to the user the appropriate context of particular query results. Additionally or alternatively, in some embodiments, the user interface elements may be embodied as text, graphics, tables, or other user interface widgets used to display the query results in an appropriate format for the user. The user interface elements may include native user interface windows or views, textual markup language elements, text-to-speech scripts, images, or any other user interface element. The computing device 102 may select and present compatible user interface elements from several versions received from the VPA server 104 or generated using the user interface element mapping 218.

In block 824, the computing device 102 presents the query results to the user using the user interface elements received from the VPA server 104 and/or generated locally by the computing device 102. For example, in some embodiments, the computing device 102 may display the user interface elements on the display 128, allowing the user to view and manipulate the results of the user request. Additionally or alternatively, the computing device 102 may read the results aloud, for example using a text-to-speech generator. In such example, the computing device 102 may provide a spoken response to the user's spoken request, facilitating natural language interaction. After presenting the query results, the method 800 loops back to block 802 to monitor for further VPA commands.

EXAMPLES

Illustrative examples of the devices, systems, and methods disclosed herein are provided below. An embodiment of the devices, systems, and methods may include any one or more, and any combination of, the examples described below.

Example 1 includes a computing device for contextual natural language processing, the computing device comprising a plurality of context source modules; a plurality of language models, wherein each language model is associated with a context source module of the plurality of context source modules; and a metadata interpretation module to index the plurality of language models; and a request interpretation module to: generate a semantic representation of a textual representation of a user request using the indexed language models, wherein the textual representation includes a plurality of words and wherein the semantic representation associates each of the words to a language model; and generate a database query as a function of the semantic representation using a database query mapping of a first context source module of the plurality of context source modules, the first context source module associated with a word of the textual representation.

Example 2 includes the subject matter of Example 1, and wherein to generate the semantic representation comprises to generate a plurality of interpretations of the textual representation, each interpretation comprising a plurality of word groups selected from the words of the textual representation; generate, for each word group of each interpretation, a ranking of the language models that orders the language models based on relevancy to the word group; generate a composite ranking for each interpretation based on the rankings of the word groups of the associated interpretation; and generate the semantic representation as a function of the composite rankings of the interpretations.

Example 3 includes the subject matter of any of Examples 1 and 2, and wherein the request interpretation module is further to generate a user interface element as a function of the semantic representation, using a user interface element mapping of the first context source module.

Example 4 includes the subject matter of any of Examples 1-3, and wherein the request interpretation module is further to apply the database query to a context database to generate query results; and the computing device further comprises a user interface module to present the query results using the user interface element.

Example 5 includes the subject matter of any of Examples 1-4, and wherein to generate the semantic representation comprises to determine a context state of the user request; and the request interpretation module is further to select the user interface element mapping from a plurality of user interface element mappings of the context source module based on the context state.

Example 6 includes the subject matter of any of Examples 1-5, and wherein to generate the semantic representation comprises to determine a context state of the user request.

Example 7 includes the subject matter of any of Examples 1-6, and wherein the request interpretation module is further to select the database query mapping from a plurality of database query mappings of the context source module based on the context state.

Example 8 includes the subject matter of any of Examples 1-7, and wherein to index the plurality of language models comprises to index a language model after deployment of the computing device to the user.

Example 9 includes the subject matter of any of Examples 1-8, and further including a user interface module to capture audio input data representing the user request; and a speech recognition engine to produce the textual representation of the user request based on the audio input data.

Example 10 includes the subject matter of any of Examples 1-9, and wherein the request interpretation module is further to generate a canonical representation of the user request using the semantic representation and the plurality of language models.

Example 11 includes the subject matter of any of Examples 1-10, and further including a sensor input module to receive context source data; wherein each of the plurality of language models is associated with a context source module capable of capturing the context source data.

Example 12 includes the subject matter of any of Examples 1-11, and further including a sensor input module to receive context source data; wherein the first context source module comprises a context capture module to (i) analyze the context source data to generate context data and (ii) store the context data in a context database.

Example 13 includes the subject matter of any of Examples 1-12, and wherein to receive the context source data comprises to receive sensor data from a sensor of the computing device; receive content data; or receive context state data from a second context source module of the plurality of context source modules.

Example 14 includes the subject matter of any of Examples 1-13, and wherein to analyze the context source data further comprises to determine a context state based on the context source data; and to store the context data comprises to store the context state in the context database.

Example 15 includes a virtual personal assistant (VPA) server for contextual natural language processing, the VPA server comprising a speech recognition engine to (i) receive, from a computing device, audio input data representing a request spoken by a user of the computing device and (ii) produce a textual representation of the user request based on the audio input data, the textual representation including a plurality of words; a metadata interpretation module to: receive a plurality of language models and associated database query mappings from the computing device; and index the plurality of language models; and a request interpretation module to: generate a semantic representation of the textual representation using the indexed language models, wherein the semantic representation associates each of the words of the textual representation to a language model; generate a database query as a function of the semantic representation using a database query mapping associated with a first language model of the plurality of language models, the first language model associated with a word of the textual representation; apply the database query to a context database to generate query results; and transmit the query results from the VPA server to the computing device.

Example 16 includes the subject matter of Example 15, and wherein to generate the semantic representation comprises to generate a plurality of interpretations of the textual representation, wherein each interpretation comprises a plurality of word groups selected from the words of the textual representation; generate, for each word group of each interpretation, a ranking of the language models that orders the language models based on relevancy to the word group; generate a composite ranking for each interpretation based on the rankings of the word groups of the associated interpretation; and generate the semantic representation as a function of the composite rankings of the interpretations.

Example 17 includes the subject matter of any of Examples 15 and 16, and wherein the metadata interpretation module is further to receive a plurality of user interface element mappings from the computing device, wherein each of the user interface element mappings is associated with a language model; and the request interpretation module is further to: generate a user interface element as a function of the semantic representation, using a user interface element mapping associated with the first language model; and transmit the user interface element from the VPA server to the computing device.

Example 18 includes the subject matter of any of Examples 15-17, and wherein to generate the semantic representation comprises to determine a context state of the user request; and the request interpretation module is further to select the user interface element mapping from the plurality of user interface element mappings based on the context state.

Example 19 includes the subject matter of any of Examples 15-18, and wherein to generate the semantic representation comprises to determine a context state of the user request.

Example 20 includes the subject matter of any of Examples 15-19, and wherein the request interpretation module is further to select the database query mapping from the plurality of database query mappings based on the context state.

Example 21 includes the subject matter of any of Examples 15-20, and wherein the request interpretation module is to generate a canonical representation of the user request using the semantic representation and the plurality of language models.

Example 22 includes a computing device for contextual natural language processing, the computing device comprising a plurality of context source modules; a plurality of language models, wherein each language model is associated with a context source module of the plurality of context source modules; a user interface module to (i) capture audio input data representing a request spoken by a user of the computing device and (ii) transmit the audio input data from the computing device to a virtual personal assistant (VPA) server; and a context source manager to transmit the plurality of language models and a plurality of associated database query mappings from the computing device to the VPA server; wherein the user interface module is further to (i) receive query results from the VPA server based on the audio input data and (ii) present the query results using a user interface element.

Example 23 includes the subject matter of Example 22, and wherein the user interface module is further to: receive a semantic representation of the user request, wherein the user request includes a plurality of words and wherein the semantic representation associates each word of the user request to a language model; and generate the user interface element as a function of the semantic representation, using a user interface element mapping of a first context source module of the plurality of context source modules, the first context source module associated with a word of the user request.

Example 24 includes the subject matter of any of Examples 22 and 23, and wherein the context source manager is further to transmit a plurality of user interface element mappings to the VPA server, wherein each of the user interface element mappings is associated with a language model; and the user interface module is further to receive the user interface element from the VPA server.

Example 25 includes the subject matter of any of Examples 22-24, and wherein to transmit the plurality of language models further comprises to transmit a first language model after deployment of the computing device to the user.

Example 26 includes the subject matter of any of Examples 22-25, and further including a sensor input module to receive context source data, wherein each of the plurality of language models is associated with a context source module capable of capturing the context source data.

Example 27 includes the subject matter of any of Examples 22-26, and further including a sensor input module to receive context source data; wherein a first context source module of the plurality of context source modules comprises a context capture module to (i) analyze the context source data to generate context data and (ii) store the context data in a context database.

Example 28 includes the subject matter of any of Examples 22-27, and wherein to receive the context source data comprises to: receive sensor data from a sensor of the computing device; receive content data; or receive context state data from a second context source module of the plurality of context source modules.

Example 29 includes the subject matter of any of Examples 22-28, and wherein to analyzing the context source data further comprises to determine a context state based on the context source data; and to store the context data comprises to store the context state in the context database.

Example 30 includes a method for contextual natural language processing, the method comprising indexing, by a computing device, a plurality of language models, wherein each language model is associated with a context source module of a plurality of context source modules; generating, by the computing device, a semantic representation of a textual representation of a user request using the indexed language models, wherein the textual representation includes a plurality of words and wherein the semantic representation associates each of the words to a language model; and generating, by the computing device, a database query as a function of the semantic representation using a database query mapping of a first context source module of the plurality of context source modules, the first context source module associated with a word of the textual representation.

Example 31 includes the subject matter of Example 30, and wherein generating the semantic representation comprises generating a plurality of interpretations of the textual representation, each interpretation comprising a plurality of word groups selected from the words of the textual representation; generating, for each word group of each interpretation, a ranking of the language models that orders the language models based on relevancy to the word group; generating a composite ranking for each interpretation based on the rankings of the word groups of the associated interpretation; and generating the semantic representation as a function of the composite rankings of the interpretations.

Example 32 includes the subject matter of any of Examples 30 and 31, and further including generating, by the computing device, a user interface element as a function of the semantic representation, using a user interface element mapping of the first context source module.

Example 33 includes the subject matter of any of Examples 30-32, and further including applying, by the computing device, the database query to a context database to generate query results; and presenting, by the computing device, the query results using the user interface element.

Example 34 includes the subject matter of any of Examples 30-33, and wherein generating the semantic representation comprises determining a context state of the user request, and wherein the method further comprises selecting, by the computing device, the user interface element mapping from a plurality of user interface element mappings of the context source module based on the context state.

Example 35 includes the subject matter of any of Examples 30-34, and wherein generating the semantic representation comprises determining a context state of the user request.

Example 36 includes the subject matter of any of Examples 30-35, and further including selecting, by the computing device, the database query mapping from a plurality of database query mappings of the context source module based on the context state.

Example 37 includes the subject matter of any of Examples 30-36, and wherein indexing the plurality of language models comprises indexing a language model after deployment of the computing device to the user.

Example 38 includes the subject matter of any of Examples 30-37, and further including capturing, by the computing device, audio input data representing the user request; and producing, by the computing device, the textual representation of the user request based on the audio input data.

Example 39 includes the subject matter of any of Examples 30-38, and further including generating, by the computing device, a canonical representation of the user request using the semantic representation and the plurality of language models.

Example 40 includes the subject matter of any of Examples 30-39, and further including receiving, by the computing device, context source data, wherein each of the plurality of language models is associated with a context source module capable of capturing the context source data.

Example 41 includes the subject matter of any of Examples 30-40, and further including receiving, by the computing device, context source data; analyzing, by the computing device, the context source data to generate context data using a context capture module of the first context source module; and storing, by the computing device, the context data in a context database.

Example 42 includes the subject matter of any of Examples 30-41, and wherein receiving the context source data comprises: receiving sensor data from a sensor of the computing device; receiving content data; or receiving context state data from a second context source module of the plurality of context source modules.

Example 43 includes the subject matter of any of Examples 30-42, and wherein analyzing the context source data further comprises determining a context state based on the context source data; and storing the context data comprises storing the context state in the context database.

Example 44 includes a method for contextual natural language processing by a virtual personal assistant (VPA) server, the method comprising receiving, by the VPA server from a computing device, audio input data representing a request spoken by a user of the computing device; producing, by VPA server, a textual representation of the user request based on the audio input data, the textual representation including a plurality of words; receiving, by the VPA server, a plurality of language models and associated database query mappings from the computing device; indexing, by the VPA server, the plurality of language models; generating, by the VPA server, a semantic representation of the textual representation using the indexed language models, wherein the semantic representation associates each of the words of the textual representation to a language model; generating, by the VPA server, a database query as a function of the semantic representation using a database query mapping associated with a first language model of the plurality of language models, the first language model associated with a word of the textual representation; applying, by the VPA server, the database query to a context database to generate query results; and transmitting the query results from the VPA server to the computing device.

Example 45 includes the subject matter of Example 44, and wherein generating the semantic representation comprises generating a plurality of interpretations of the textual representation, each interpretation comprising a plurality of word groups selected from the words of the textual representation; generating, for each word group of each interpretation, a ranking of the language models that orders the language models based on relevancy to the word group; generating a composite ranking for each interpretation based on the rankings of the word groups of the associated interpretation; and generating the semantic representation as a function of the composite rankings of the interpretations.

Example 46 includes the subject matter of any of Examples 44 and 45, and further including receiving, by the VPA server, a plurality of user interface element mappings from the computing device, wherein each of the user interface element mappings is associated with a language model; generating, by the VPA server, a user interface element as a function of the semantic representation, using a user interface element mapping associated with the first language model; and transmitting the user interface element from the VPA server to the computing device.

Example 47 includes the subject matter of any of Examples 44-46, and wherein generating the semantic representation comprises determining a context state of the user request, and wherein the method further comprises selecting, by the VPA server, the user interface element mapping from the plurality of user interface element mappings based on the context state.

Example 48 includes the subject matter of any of Examples 44-47, and wherein generating the semantic representation comprises determining a context state of the user request.

Example 49 includes the subject matter of any of Examples 44-48, and further including selecting, by the VPA server, the database query mapping from the plurality of database query mappings based on the context state.

Example 50 includes the subject matter of any of Examples 44-49, and further including generating, by the VPA server, a canonical representation of the user request using the semantic representation and the plurality of language models.

Example 51 includes a method for contextual natural language processing by a computing device, the method comprising capturing, by the computing device, audio input data representing a request spoken by a user of the computing device; transmitting the audio input data from the computing device to a virtual personal assistant (VPA) server; transmitting a plurality of language models and associated database query mappings from the computing device to the VPA server, wherein each of the language models and associated database query mappings is associated with a context source module of a plurality of context source modules; receiving, by the computing device, query results from the VPA server based on the audio input data; and presenting, by the computing device, the query results using a user interface element.

Example 52 includes the subject matter of Example 51, and further including receiving, by the computing device, a semantic representation of the user request, wherein the user request includes a plurality of words and wherein the semantic representation associates each word of the user request to a language model; and generating, by the computing device, the user interface element as a function of the semantic representation, using a user interface element mapping of a first context source module of the plurality of context source modules, the first context source module associated with a word of the user request.

Example 53 includes the subject matter of any of Examples 51 and 52, and further including transmitting a plurality of user interface element mappings to the VPA server, wherein each of the user interface element mappings is associated with a language model; and receiving, by the computing device, the user interface element from the VPA server.

Example 54 includes the subject matter of any of Examples 51-53, and wherein transmitting the plurality of language models further comprises transmitting a first language model after deployment of the computing device to the user.

Example 55 includes the subject matter of any of Examples 51-54, and further including receiving, by the computing device, context source data, wherein each of the plurality of language models is associated with a context source module capable of capturing the context source data.

Example 56 includes the subject matter of any of Examples 51-55, and further including receiving, by the computing device, context source data; analyzing, by the computing device, the context source data to generate context data using a context capture module of a first context source module of the plurality of context source modules; and storing, by the computing device, the context data in a context database.

Example 57 includes the subject matter of any of Examples 51-56, and wherein receiving the context source data comprises: receiving sensor data from a sensor of the computing device; receiving content data; or receiving context state data from a second context source module of the plurality of context source modules.

Example 58 includes the subject matter of any of Examples 51-57, and wherein analyzing the context source data further comprises determining a context state based on the context source data; and storing the context data comprises storing the context state in the context database.

Example 59 includes a computing device comprising a processor; and a memory having stored therein a plurality of instructions that when executed by the processor cause the computing device to perform the method of any of Examples 30-58.

Example 60 includes one or more machine readable storage media comprising a plurality of instructions stored thereon that in response to being executed result in a computing device performing the method of any of Examples 30-58.

Example 61 includes a computing device comprising means for performing the method of any of Examples 30-58.

The invention claimed is:

1. A computing device for automatically querying a database for contextual natural language processing, the computing device comprising:
   a plurality of context source modules;
   a plurality of language models, wherein each language model is associated with a context source module of the plurality of context source modules; and
   a metadata interpretation module to index the plurality of language models to determine a plurality of important words of each of the plurality of language models that are important for the corresponding context source module; and
   a request interpretation module to:
   determine, for each of the plurality of language models, a relevance measure of a plurality of words of a textual representation of a user request based on the plurality of important words of the corresponding language model;
   generate a ranking of the determined relevance measures corresponding to the plurality of language models;
   generate, based on the ranking of the determined relevance measures, a semantic representation of the textual representation of the user request;
   generate a database query as a function of the semantic representation using a database query mapping of a first context source module of the plurality of context source modules, the first context source module associated with a word of the textual representation; and
   apply the database query generated as a function of the semantic representation.

2. The computing device of claim 1, wherein the request interpretation module is further to:
   generate a plurality of interpretations of the textual representation, each interpretation comprising a plurality of word groups selected from the words of the textual representation;
   generate, for each word group of each interpretation, a ranking of each of the plurality of language models that orders the plurality of language models based on relevancy to the word group based on the plurality of important words of the corresponding language model; and
   generate a composite ranking for each interpretation based on the rankings of the word groups of the associated interpretation,
   wherein to generate the semantic representation comprises to generate the semantic representation as a function of the composite rankings of the interpretations.

3. The computing device of claim 2, wherein the request interpretation module is further to calculate, for each word group of each interpretation, a term frequency-inverse document frequency (TF-IDF) value, and
   wherein to generate, for each word group of each interpretation, the ranking of each of the plurality of language models comprises to generate, for each word group of each interpretation, the ranking of each of the plurality of language models based on the calculated TF-IDF values.

4. The computing device of claim 1, wherein the request interpretation module is further to:
select a user interface element for generation from a plurality of user interface elements as a function of the semantic representation using a user interface element mapping of the first context source module; and
generate the selected user interface element as a function of the semantic representation, using the user interface element mapping of the first context source module.

5. The computing device of claim 4, wherein to apply the database query comprises to apply the database query to a context database to generate query results; and
wherein the computing device further comprises a user interface module to present the query results using the user interface element.

6. The computing device of claim 1, wherein to generate the semantic representation comprises to determine a context state of the user request.

7. The computing device of claim 1, wherein the request interpretation module is further to generate a canonical representation of the user request using the semantic representation and the plurality of language models, wherein the canonical representation uses standardized vocabulary different from vocabulary in the user request.

8. The computing device of claim 1, further comprising:
a sensor input module to receive context source data;
wherein each of the plurality of language models is associated with a context source module capable of capturing the context source data.

9. A virtual personal assistant (VPA) server for automatically querying a database for contextual natural language processing, the VPA server comprising:
a speech recognition engine to (i) receive, from a computing device, audio input data representing a request spoken by a user of the computing device and (ii) produce a textual representation of the user request based on the audio input data, the textual representation including a plurality of words;
a metadata interpretation module to:
receive a plurality of language models and associated database query mappings from the computing device; and
index the plurality of language models to determine a plurality of important words of each of the plurality of language models; and
a request interpretation module to:
determine, for each of the plurality of language models, a relevance measure of a plurality of words of the textual representation of the user request based on the plurality of important words of the corresponding language model;
generate a ranking of the determined relevance measures corresponding to the plurality of language models;
generate, based on the ranking of the determined relevance measures, a semantic representation of the textual representation;
generate a database query as a function of the semantic representation using a database query mapping associated with a first language model of the plurality of language models, the first language model associated with a word of the textual representation;
apply the database query to a context database to generate query results; and transmit the query results from the VPA server to the computing device.

10. The VPA server of claim 9, wherein the request interpretation module is further to:
generate a plurality of interpretations of the textual representation, wherein each interpretation comprises a plurality of word groups selected from the words of the textual representation;
generate, for each word group of each interpretation, a ranking of each of the plurality of language models that orders the plurality of language models based on relevancy to the word group based on the plurality of important words of the corresponding language model; and
generate a composite ranking for each interpretation based on the rankings of the word groups of the associated interpretation,
wherein to generate the semantic representation comprises to generate the semantic representation as a function of the composite rankings of the interpretations.

11. The VPA server of claim 9, wherein:
the metadata interpretation module is further to receive a plurality of user interface element mappings from the computing device, wherein each of the user interface element mappings is associated with a language model; and
the request interpretation module is further to:
select a user interface element for generation from a plurality of user interface elements as a function of the semantic representation using a user interface element mapping associated with the first language model; and
generate the selected user interface element as a function of the semantic representation, using the user interface element mapping associated with the first language model; and
transmit the user interface element from the VPA server to the computing device.

12. The VPA server of claim 9, wherein to generate the semantic representation comprises to determine a context state of the user request.

13. The VPA server of claim 9, wherein the request interpretation module is to generate a canonical representation of the user request using the semantic representation and the plurality of language models, wherein the canonical representation uses standardized vocabulary different from vocabulary in the user request.

14. One or more non-transitory computer-readable storage media device for automatically querying a database for contextual natural language processing comprising a plurality of instructions that in response to being executed cause a computing device to:
index a plurality of language models to determine a plurality of important words of each of the plurality of language models that are important for the corresponding context source module, wherein each language model is associated with a context source module of a plurality of context source modules;
determine, for each of the plurality of language models, a relevance measure of a plurality of words of a textual representation of a user request based on the plurality of important words of the corresponding language model;
generate a ranking of the determined relevance measures corresponding to the plurality of language models;

generate a semantic representation of the textual representation of the user request;
generate a database query as a function of the semantic representation using a database query mapping of a first context source module of the plurality of context source modules, the first context source module associated with a word of the textual representation; and
apply the database query generated as a function of the semantic representation.

15. The one or more non-transitory computer-readable storage media of claim 14, further comprising a plurality of instructions that in response to being executed cause the computing device to:
generate a plurality of interpretations of the textual representation, each interpretation comprising a plurality of word groups selected from the words of the textual representation;
generate, for each word group of each interpretation, a ranking of the language models that orders the language models based on relevancy to the word group; and
generate composite ranking for each interpretation based on the rankings of the word groups of the associated interpretation,
wherein to generate the semantic representation comprises to generate the semantic representation as a function of the composite rankings of the interpretations.

16. The one or more non-transitory computer-readable storage media of claim 14, further comprising a plurality of instructions that in response to being executed cause the computing device to:
select a user interface element for generation from a plurality of user interface elements as a function of the semantic representation using a user interface element mapping of the first context source module; and
generate the user interface element as a function of the semantic representation, using the user interface element mapping of the first context source module.

17. The one or more non-transitory computer-readable storage media of claim 14, wherein to index the plurality of language models comprises to index a language model after deployment of the computing device to the user.

18. One or more non-transitory computer-readable storage media for automatically querying a database for contextual natural language processing comprising a plurality of instructions that in response to being executed cause a virtual personal assistant (VPA) server to:
receive, from a computing device, audio input data representing a request spoken by a user of the computing device;
produce a textual representation of the user request based on the audio input data, the textual representation including a plurality of words;
receive a plurality of language models and associated database query mappings from the computing device;
index the plurality of language models to determine a plurality of important words of each of the plurality of language models;
determine, for each of the plurality of language models, a relevance measure of a plurality of words of the textual representation of the user request based on the plurality of important words of the corresponding language model;
generate a ranking of the determined relevance measures corresponding to the plurality of language models;
generate, based on the ranking of the determined relevance measures, a semantic representation of the textual representation;
generate a database query as a function of the semantic representation using a database query mapping associated with a first language model of the plurality of language models, the first language model associated with a word of the textual representation;
apply the database query to a context database to generate query results; and
transmit the query results from the VPA server to the computing device.

19. The one or more non-transitory computer-readable storage media of claim 18, further comprising a plurality of instructions that in response to being executed cause the computing device to:
generate a plurality of interpretations of the textual representation, each interpretation comprising a plurality of word groups selected from the words of the textual representation;
generate, for each word group of each interpretation, a ranking of each of the plurality of language models that orders the plurality of language models based on relevancy to the word group based on the plurality of important words of the corresponding language model; and
generate a composite ranking for each interpretation based on the rankings of the word groups of the associated interpretation,
wherein to generate the semantic representation comprises to generate the semantic representation as a function of the composite rankings of the interpretations.

20. The one or more non-transitory computer-readable storage media of claim 18, further comprising a plurality of instructions that in response to being executed cause the VPA server to:
receive a plurality of user interface element mappings from the computing device, wherein each of the user interface element mappings is associated with a language model;
select a user interface element for generation from a plurality of user interface elements as a function of the semantic representation using a user interface element mapping associated with the first language model; and
generate the selected user interface element as a function of the semantic representation, using the user interface element mapping associated with the first language model; and
transmit the user interface element from the VPA server to the computing device.

* * * * *